United States Patent
Schwerdtfeger et al.

(10) Patent No.: US 10,589,353 B2
(45) Date of Patent: Mar. 17, 2020

(54) DATUM STRUCTURE FOR ADDITIVELY MANUFACTURED OBJECT REMOVAL FROM BUILD PLATFORM

(71) Applicant: General Electric Company, Schenectady, NY (US)

(72) Inventors: Jan Vladimir Schwerdtfeger, Birr (CH); Juan Vicente Haro Gonzalez, Zurich (CH); David Mazzolini, Rieden (CH); Felix Martin Gerhard Roerig, Baden (CH); Steve Seifert, Grettstadt (DE)

(73) Assignee: General Electric Company, Schenectady, NY (US)

( * ) Notice: Subject to any disclaimer, the term of this patent is extended or adjusted under 35 U.S.C. 154(b) by 265 days.

(21) Appl. No.: 15/792,928

(22) Filed: Oct. 25, 2017

(65) Prior Publication Data

US 2019/0118261 A1 Apr. 25, 2019

(51) Int. Cl.

| | | |
|---|---|---|
| *B22F 3/105* | (2006.01) | |
| *B33Y 30/00* | (2015.01) | |
| *B33Y 10/00* | (2015.01) | |
| *B23K 26/342* | (2014.01) | |
| *B29C 64/379* | (2017.01) | |
| *B22F 3/10* | (2006.01) | |
| *G05B 19/4097* | (2006.01) | |
| *B29C 64/153* | (2017.01) | |
| *B22F 3/24* | (2006.01) | |

(52) U.S. Cl.
CPC .......... *B22F 3/1055* (2013.01); *B23K 26/342* (2015.10); *B29C 64/379* (2017.08); *B33Y 10/00* (2014.12); *B33Y 30/00* (2014.12); *B22F 2003/1042* (2013.01); *B22F 2003/1056* (2013.01); *B22F 2003/1057* (2013.01); *B22F 2003/1058* (2013.01); *B22F 2003/247* (2013.01); *B22F 2201/02* (2013.01); *B22F 2201/10* (2013.01); *B22F 2202/06* (2013.01); *B22F 2998/10* (2013.01); *B22F 2999/00* (2013.01); *B29C 64/153* (2017.08); *G05B 19/4097* (2013.01)

(58) Field of Classification Search
CPC .............................. B22F 3/1055; B33Y 30/00
USPC .......................................................... 419/61
See application file for complete search history.

(56) References Cited

U.S. PATENT DOCUMENTS

2016/0031010 A1 2/2016 O'Neill et al.

FOREIGN PATENT DOCUMENTS

| JP | 2004231997 A | 8/2004 |
|---|---|---|
| WO | 2016177894 A1 | 11/2016 |

*Primary Examiner* — Weiping Zhu
(74) *Attorney, Agent, or Firm* — Hoffman Warnick LLC

(57) ABSTRACT

An additively manufactured (AM) structure includes a removal plane extending therein defining an object thereabove. The AM structure also includes at least one datum structure coupled relative to the AM structure. Each datum structure includes a vertical reference plane for guiding a cutting element to remove the object from a remaining portion of the AM structure through the removal plane. The vertical reference plane is horizontally coplanar with the removal plane of the AM structure. The datum structures allow for accurate object cuts regardless of whether an AM build platform is horizontal or non-planar.

20 Claims, 9 Drawing Sheets

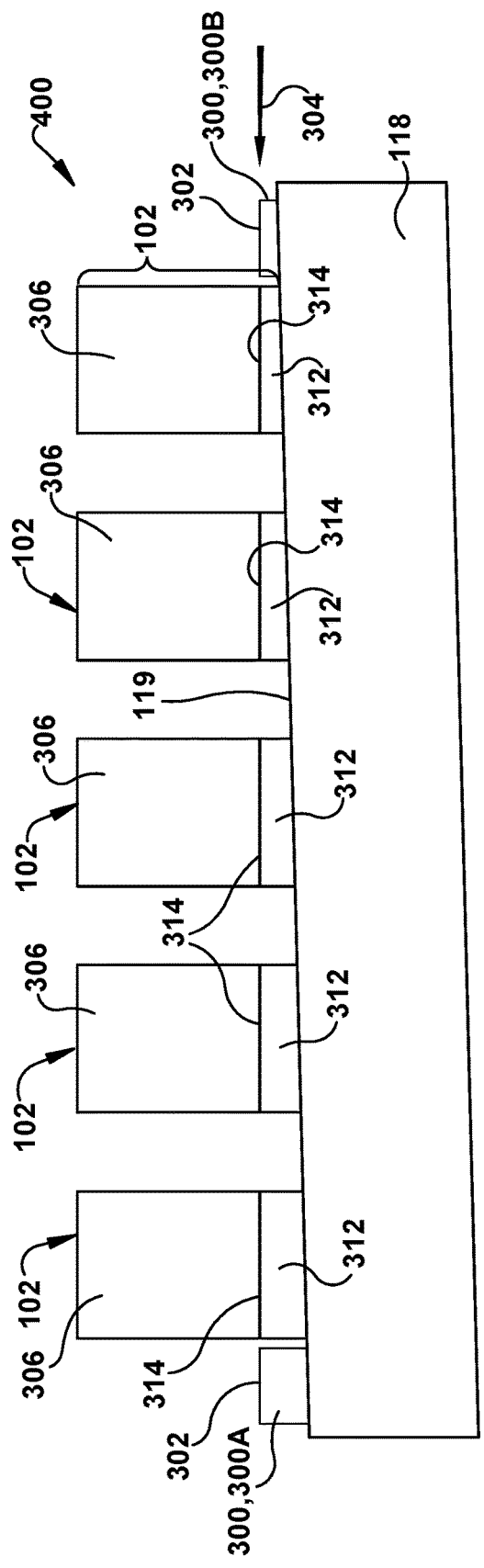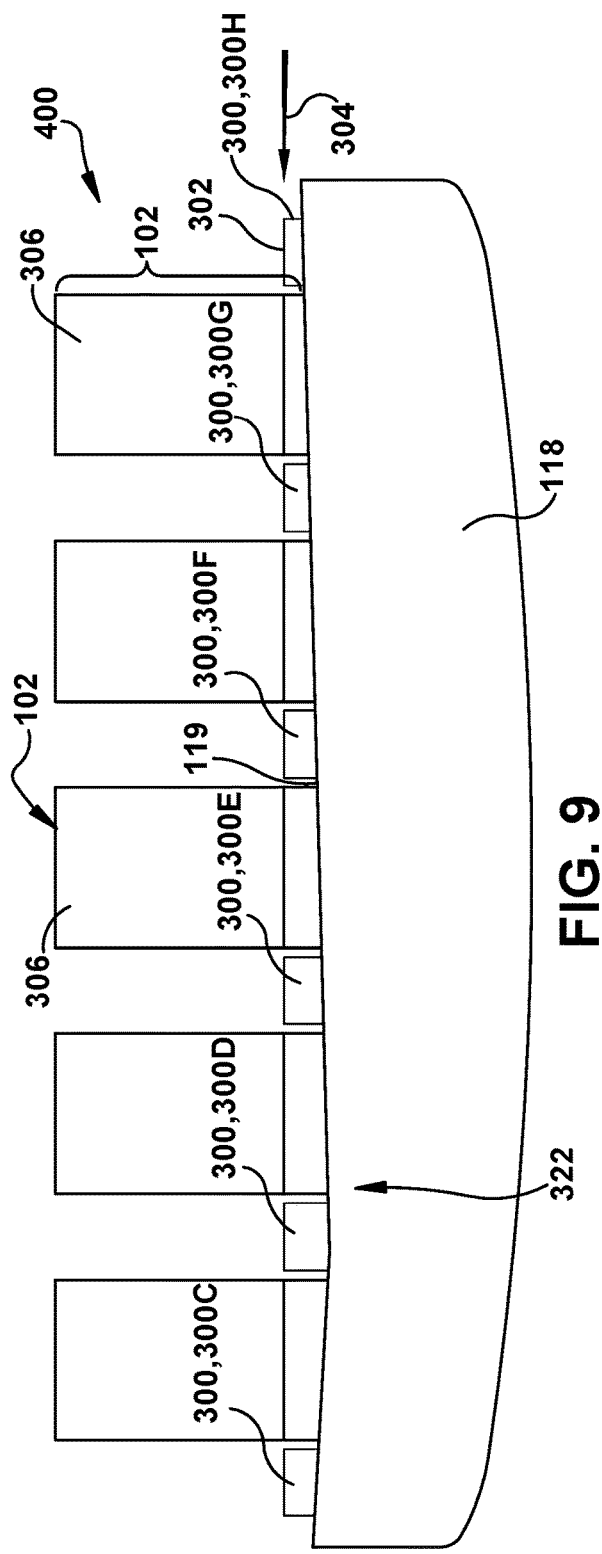

DATUM STRUCTURE FOR ADDITIVELY MANUFACTURED OBJECT REMOVAL FROM BUILD PLATFORM

BACKGROUND OF THE INVENTION

The disclosure relates generally to additive manufacturing (AM), and more particularly, to a datum structure for use in guiding removal of an object from an AM structure, which may be on an upper surface of an AM build platform.

The pace of change and improvement in the realms of power generation, aviation, and other fields has accompanied extensive research for manufacturing objects used in these fields. Conventional manufacture of metallic, plastic or ceramic composite objects generally includes milling or cutting away regions from a slab of material before treating and modifying the cut material to yield a part, which may have been simulated using computer models, e.g., in drafting software. Manufactured objects which may be formed from metal can include, e.g., airfoil objects for installation in a turbomachine such as an aircraft engine or power generation system.

Additive manufacturing (AM) includes a wide variety of processes of producing an object through the successive layering of material rather than the removal of material. As such, additive manufacturing can create complex geometries without the use of any sort of systems, molds or fixtures, and with little or no waste material. Instead of machining objects from solid billets of material, much of which is cut away and discarded, the only material used in additive manufacturing is what is required to shape the object.

Additive manufacturing techniques typically include taking a three-dimensional computer aided design (CAD) file of the object to be formed, electronically slicing the object into layers, e.g., 18-102 micrometers thick, and creating a file with a two-dimensional image of each layer, including vectors, images or coordinates. The file may then be loaded into a preparation software system that interprets the file such that the object can be built by different types of additive manufacturing systems. In 3D printing, rapid prototyping (RP), and direct digital manufacturing (DDM) forms of additive manufacturing, material layers are selectively dispensed, sintered, formed, deposited, etc., to create the object.

In metal powder additive manufacturing techniques, such as direct metal laser melting (DMLM) (also referred to as selective laser melting (SLM)), metal powder layers are sequentially melted together to form an additive manufacturing (AM) structure that includes the object. More specifically, fine metal powder layers are sequentially melted after being uniformly distributed using an applicator on a metal powder bed. Each applicator includes an applicator element in the form of a lip, brush, blade or roller made of metal, plastic, ceramic, carbon fibers or rubber that spreads the metal powder evenly over the build platform. The metal powder bed can be moved in a vertical axis. The process takes place in a processing chamber having a precisely controlled atmosphere. Once each layer is created, each two dimensional slice of the object geometry can be fused by selectively melting the metal powder. The melting may be performed by a high powered melting beam, such as a 100 Watt ytterbium laser, to fully weld (melt) the metal powder to form a solid metal. The melting beam moves in the X-Y direction using scanning mirrors, and has an intensity sufficient to fully weld (melt) the metal powder to form a solid metal. The metal powder bed may be lowered for each subsequent two dimensional layer, and the process repeats until the AM structure is completely formed. Once the AM structure is complete, at least a portion thereof can be removed from the build platform, creating the final object. In order to create certain larger objects faster, some metal additive manufacturing systems employ more than one high powered laser that work together to form a larger AM structure including the larger object.

Build platforms used in metal powder additive manufacturing typically have a number of desirable attributes. First, an upper surface of the build platform should be installed in horizontal alignment with an applicator of the AM system to ensure even layers of raw material are created. FIG. 1 shows a build platform 10 and its upper surface 12 in a horizontal or non-tilted position, i.e., aligned with an applicator element (not shown). During additive manufacturing, additive manufacturing (AM) structures 14A-C are sequentially built on upper surface 12. Each AM structure 14A-C includes a portion 16A-C therein configured to be an object 18A-C after the object is cut from any remaining portion 20A-C of the AM structure on upper surface 12. More specifically, each AM structure 14A-C includes a removal plane 22A-C extending therein defining an object 18A-C thereabove. Ideally, build platform 10 is horizontal such that removal planes 22A-C are coplanar, and equidistant from upper surface 12 after being formed. That is, build platform 10 is horizontally aligned with the applicator element of the AM system (not shown) so even layers of raw material are created. In this case, a cutting element (not shown)(e.g., that of a wire electrical discharge machine (w-EDM)) would remove each object 18A-E from a remaining portion 20A-C of AM structure 14A-C by cutting parallel to upper surface 12 through removal planes 22A-C, along the dashed line. This process uses zero point clamping devices (not shown) to employ upper surface 12 as a vertical reference plane (not the objects) for guiding the cutting element. Referring to FIG. 2, where build platform 10 is not horizontal in the AM system, the AM system naturally enlarges portions 20A-C during the build of AM structures 14A-C such that objects 18A-C all extend to the same height. Here, when upper surface 12 acts as a vertical reference plane for guiding the cutting element, each object 18A-C is not cut off near the desired final dimensions during the w-EDM process.

A second desirable attribute of a build platform is that it be planar. Build platforms can become non-planar in a number of ways. First, as shown in FIG. 3, during additive manufacturing, build platforms may deform, e.g., due to thermal stress, or the weight of objects 14A-E thereon. Second, build platforms are typically machined between reuses to, for example, remove remaining portions (e.g., 22A-C in FIG. 2) of AM structures. The machining can result in non-planar upper surfaces on the build platform. As shown in FIG. 3, when upper surface 12 acts as a vertical reference plane for guiding the cutting element and it is not planar, each object 14A-E is not cut off near the desired final dimensions during the w-EDM process.

Regardless of whether the build platform is not horizontal or not planar, each resulting object must be extensively machined to remove the unwanted material, which increases cost and time necessary to manufacture each object. The unwanted material oftentimes ends up as waste, diminishing the benefits of the additive manufacturing process.

BRIEF DESCRIPTION OF THE INVENTION

A first aspect of the disclosure provides an apparatus, comprising: a build platform configured to support an object build in an additive manufacturing system, the build platform having an upper surface being at least one of non-horizontal and non-planar; an additively manufactured (AM) structure on the upper surface of the build platform, the AM structure including a removal plane extending therein defining an object thereabove; and a datum structure positioned relative to the build platform and including a vertical reference plane for guiding a cutting element to remove the object from a remaining portion of the AM structure, the vertical reference plane horizontally coplanar with the removal plane.

A second aspect of the disclosure provides a method, comprising: additively manufacturing at least one additive manufacturing (AM) structure on an upper surface of a build platform, the upper surface being at least one of non-horizontal and non-planar, each AM structure including a removal plane extending therein defining an object thereabove; and while additively manufacturing the at least one AM structure, additively manufacturing at least one datum structure positioned relative to the build platform, each datum structure including a vertical reference plane for guiding a cutting element to remove the object from a remaining portion of the AM structure, wherein each vertical reference plane is horizontally coplanar with the removal plane of each AM structure.

A third aspect of the disclosure provides an additively manufactured (AM) structure, comprising: a removal plane extending therein defining an object thereabove; and at least one datum structure coupled relative to the AM structure, the at least one datum structure including a vertical reference plane for guiding a cutting element to remove the object from a remaining portion of the AM structure on the build platform through the removal plane, the vertical reference plane horizontally coplanar with the removal plane of the object.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which:

FIG. 8 shows a side view of the non-horizontal build platform of FIG. 7.

FIG. 9 shows a side view of a non-planar build platform having additive manufacturing (AM) structures including datum structures according to embodiments of the disclosure.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

Embodiments of the disclosure provide an apparatus, method and additive manufactured (AM) structure that employ a datum structure including a vertical reference plane for guiding a cutting element to remove the object from a remaining portion of the AM structure. The datum structure may be positioned relative to a build platform or the AM structure. The build platform is configured to support an object build in an additive manufacturing system, and has an upper surface that is non-horizontal and/or non-planar. An AM structure is additively manufactured on the upper surface of the build platform, and includes a removal plane extending therein defining an object, i.e., a final product of the AM, thereabove. Cutting through the removal plane results in the object being near its desired final dimensions. The datum structure provides a vertical reference plane that is horizontally coplanar with the removal plane. In this manner, a cutting element used to remove the object from the AM structure can reference the vertical reference plane of the datum structure, rather than the upper surface of the build platform, so the objects are cut off in a uniform manner and near the desired final dimensions. The disclosure thus reduces the need to be exact in positioning the build platform horizontal, e.g., aligned with the applicator, in the AM system, and reduces the need for the build platform to be perfectly planar. The datum structures also improve the precision and speed of cut, e.g., using wire electrical discharge machining (w-EDM), and separation of objects from a remaining portion of the AM structure.

Figure 4:
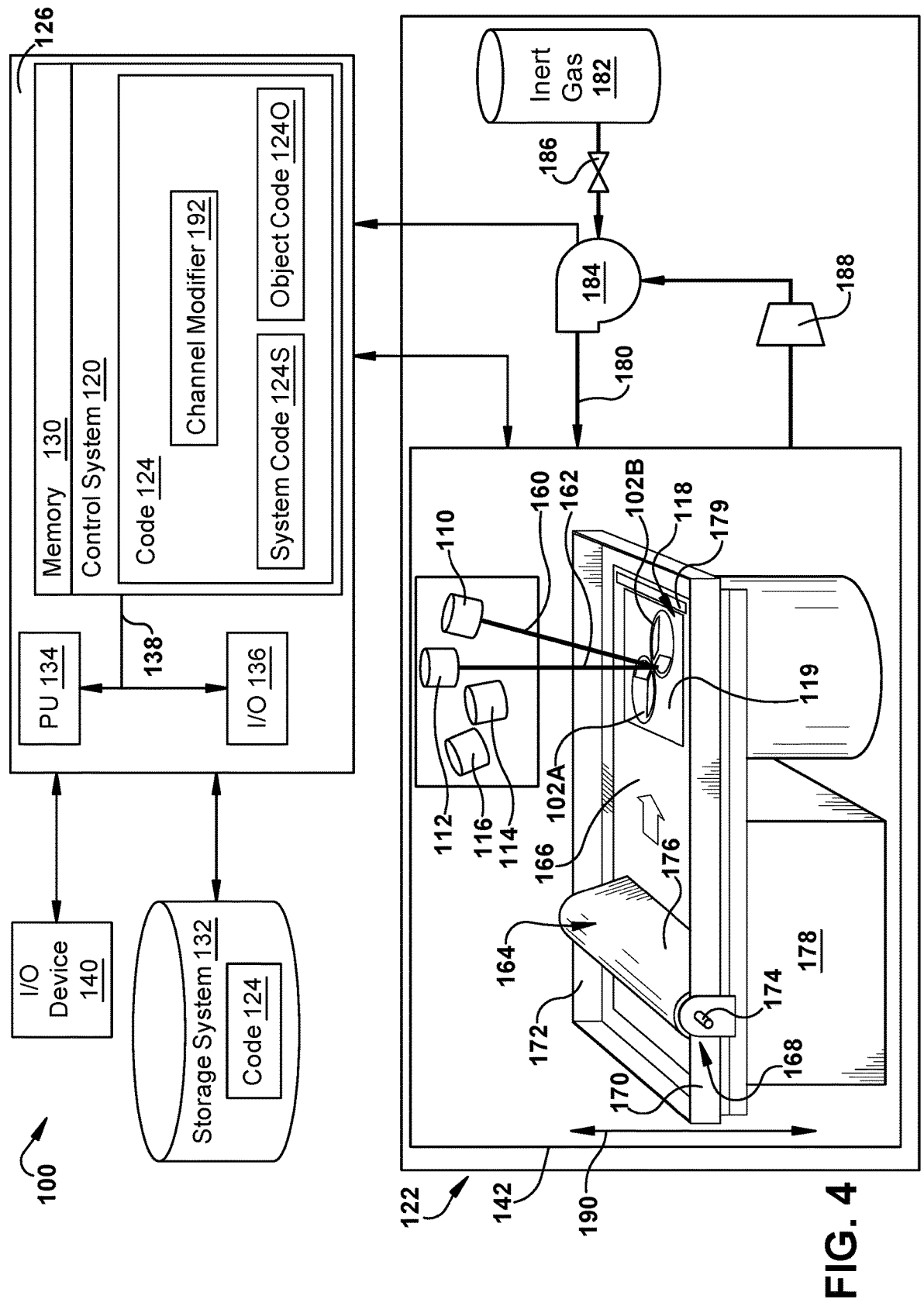
FIG. 4 shows a block diagram of an additive manufacturing system and process including a non-transitory computer readable storage medium storing code representative of an AM structure according to embodiments of the disclosure.

FIG. 4 shows a schematic/block view of an illustrative computerized metal powder additive manufacturing system 100 (hereinafter 'AM system 100') for generating an AM structure(s) 102. The term "AM structure" is used herein to describe that structure built by the AM process in AM system 100 that includes a final object but also perhaps some remaining portion that needs to be removed to arrive at the final object. The remaining portion may remain on a build platform of the AM system or be cut away from the AM structure after it is removed from the build platform. Each AM structure includes a removal plane extending therein defining an object thereabove. Each "object" represents the final or near final product of the AM process (perhaps with some finishing thereafter). One large AM structure or multiple AM structures, e.g., two AM structures 102A, 102B as shown, may be created at one time (only a single layer thereof is shown). The teachings of the disclosures will be described relative to building AM structure(s) 102 using multiple melting beam sources, e.g., four lasers 110, 112, 114, 116, but it is emphasized and will be readily recognized that the teachings of the disclosure are equally applicable to build multiple AM structure(s) 102 using any number of melting beam sources, i.e., one or more. In this example, AM system 100 is arranged for direct metal laser melting (DMLM). It is understood that the general teachings of the disclosure are equally applicable to other forms of metal powder additive manufacturing such as but not limited to direct metal laser sintering (DMLS), selective laser sintering (SLS), electron beam melting (EBM), and perhaps other forms of additive manufacturing. AM structure(s) 102 are illustrated as circular elements to create circular objects; however, it is understood that the additive manufacturing process can be readily adapted to manufacture any shaped object, a large variety of objects and a large number of objects on a build platform 118.

AM system 100 generally includes a metal powder additive manufacturing control system 120 ("control system") and an AM printer 122. As will be described, control system 120 executes object code 124O to generate AM structure(s) 102 using multiple melting beam sources 110, 112, 114, 116. In the example shown, four melting beam sources may include four lasers. However, the teachings of the disclosures are applicable to any melting beam source, e.g., an electron beam, laser, etc. Control system 120 is shown implemented on computer 126 as computer program code. To this extent, computer 126 is shown including a memory 130 and/or storage system 132, a processor unit (PU) 134, an input/output (IO) interface 136, and a bus 138. Further, computer 126 is shown in communication with an external 1lO device/resource 140 and storage system 132. In general, processor unit (PU) 134 executes computer program code 124 that is stored in memory 130 and/or storage system 132. While executing computer program code 124, processor unit (PU) 134 can read and/or write data to/from memory 130, storage system 132, I/O device 140 and/or AM printer 122. Bus 138 provides a communication link between each of the components in computer 126, and I/O device 140 can comprise any device that enables a user to interact with computer 126 (e.g., keyboard, pointing device, display, etc.). Computer 126 is only representative of various possible combinations of hardware and software. For example, processor unit (PU) 134 may comprise a single processing unit, or be distributed across one or more processing units in one or more locations, e.g., on a client and server. Similarly, memory 130 and/or storage system 132 may reside at one or more physical locations. Memory 130 and/or storage system 132 can comprise any combination of various types of non-transitory computer readable storage medium including magnetic media, optical media, random access memory (RAM), read only memory (ROM), etc. Computer 126 can comprise any type of computing device such as an industrial controller, a network server, a desktop computer, a laptop, a handheld device, etc.

As noted, AM system 100 and, in particular control system 120, executes program code 124 to generate AM structure(s) 102 (eventually, objects). Program code 124 can include, inter alia, a set of computer-executable instructions (herein referred to as 'system code 124S') for operating AM printer 122 or other system parts, and a set of computer-executable instructions (herein referred to as 'object code 124O') defining AM structure(s) 102 (and the object to be therein) to be physically generated by AM printer 122. As described herein, additive manufacturing processes begin with a non-transitory computer readable storage medium (e.g., memory 130, storage system 132, etc.) storing program code 124. System code 124S for operating AM printer 122 may include any now known or later developed software code capable of operating AM printer 122.

Object code 124O defining AM structure(s) 102 may include a precisely defined 3D model of an object and any other necessary supporting structures (e.g., a remaining portion of AM structure 102 or a sacrificial support). Object code 124O can be generated from any of a large variety of well-known computer aided design (CAD) software systems such as AutoCAD®, TurboCAD®, DesignCAD 3D Max, etc. In this regard, object code 124O can include any now known or later developed file format. Furthermore, object code 124O representative of AM structure(s) 102 may be translated between different formats. For example, object code 124O may include Standard Tessellation Language (STL) files which was created for stereolithography CAD programs of 3D Systems, or an additive manufacturing file (AMF), which is an American Society of Mechanical Engineers (ASME) standard that is an extensible markup-language (XML) based format designed to allow any CAD software to describe the shape and composition of any three-dimensional object to be fabricated on any AM printer. Object code 124O representative of AM structure(s) 102 may also be converted into a set of data signals and transmitted, received as a set of data signals and converted to code, stored, etc., as necessary. In any event, object code 124O may be an input to AM system 100 and may come from a part designer, an intellectual property (IP) provider, a design company, the operator or owner of AM system 100, or from other sources. In any event, control system 120 executes system code 124S and object code 124O, dividing AM structure(s) 102 into a series of thin slices that assembles using AM printer 122 in successive layers of material.

AM printer 122 may include a processing chamber 142 that is sealed to provide a controlled atmosphere for AM structure(s) 102 printing, e.g., a set pressure and temperature for lasers, or a vacuum for electron beam melting. A build platform 118, upon which AM structure(s) 102 is/are built, is positioned within processing chamber 142. As will be described herein, mounting build platform 118 in a horizontal manner, e.g., such that it is aligned with applicator 164 (described elsewhere herein) can be challenging. Further, build platform 118 may include an upper surface 119 that is not planar. In any event, a number of melting beam sources 110, 112, 114, 116 are configured to melt layers of metal powder on build platform 118 to generate AM structure(s) 102. While four melting beam sources 110, 112, 114, 116 will be described herein, it is emphasized that the teachings of the disclosure are applicable to a system employing any number of sources, e.g., 1, 2, 3, or 5 or more.

Figure 5:
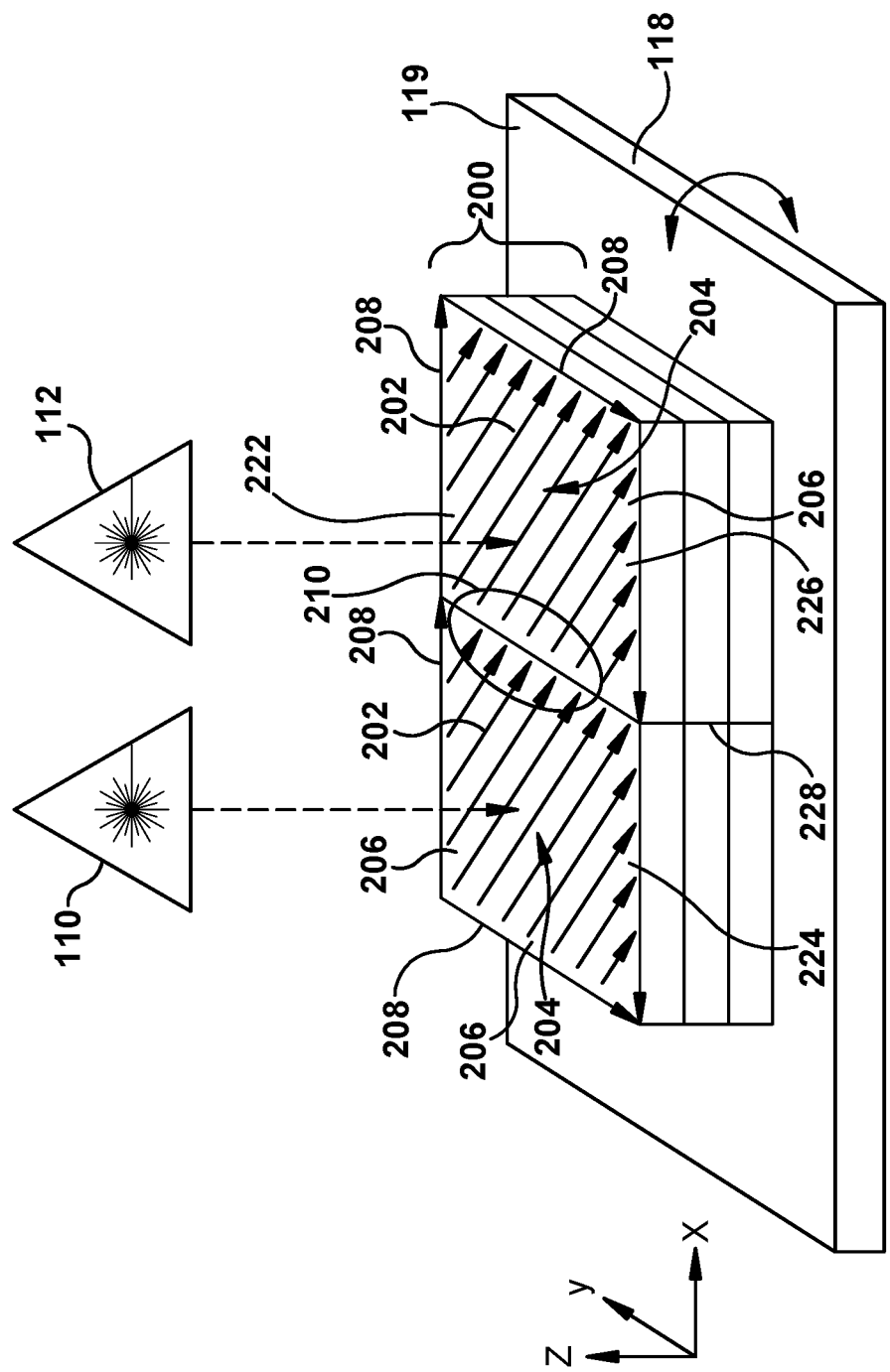
FIG. 5 shows a schematic perspective view of a two melting beam source additive manufacturing system building an object.

FIG. 5 shows a schematic perspective view of melting beams of AM system using two melting beam sources 110, 112, e.g., lasers. During operation, the melting beam(s) (dashed lines) are guided, e.g., by scanner mirrors for lasers or electromagnetic field/electric coils for electron beams, along scan vectors (paths), which are indicated by arrows on a top surface of illustrative object 200. Internal scan vectors 202 melt inner regions 204 of object 200 that scan linearly across a layer, and a very thin border 206 is melted with one to three contour scan vectors 208 that only follow a desired outer edge of the layer. Each laser 110, 112 has its own field (1 and 2, respectively) upon which it can work. Each melting beam source 110, 112 may work within only a small portion of its respective field at any given time. Each field and the scan vectors are assigned to one or the other source 110, 112 with an interface 210 (within circle) where fields 1, 2 of pair of sources 110, 112 meet. Which scan vector is made by which source usually depends on the region that can be reached by each source. Each melting beam source 110, 112 is calibrated in any now known or later developed manner. That is, each melting beam source 110, 112 has had its laser or electron beam's anticipated position relative to build platform 118 correlated with its actual position in order to provide an individual position correction (not shown) to ensure its individual accuracy. Interface 210 in body 222 of AM structure 200 defines a first portion 224 and a second portion 226 of body 222 of an object made by different melting beam sources 110, 112 of multiple melting beam source AM system 100 during a single build. Here, fields 1, 2 meet at a line, creating a planar interface 228 in object 200.

Figure 1:
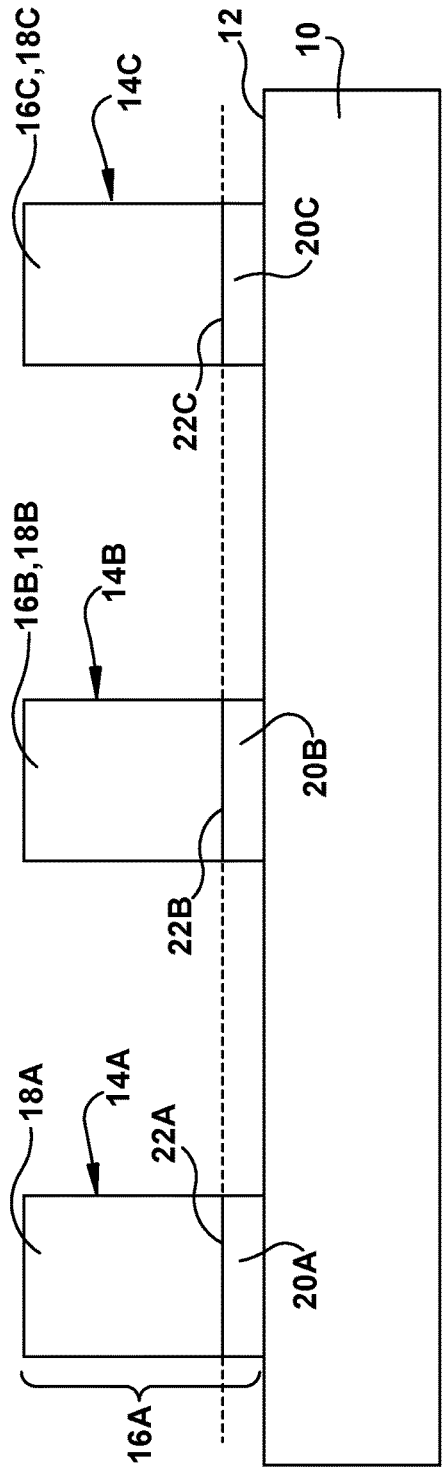
FIG. 1 shows a side view of a conventional horizontal and planar build platform with AM structures thereon.
Figure 6:
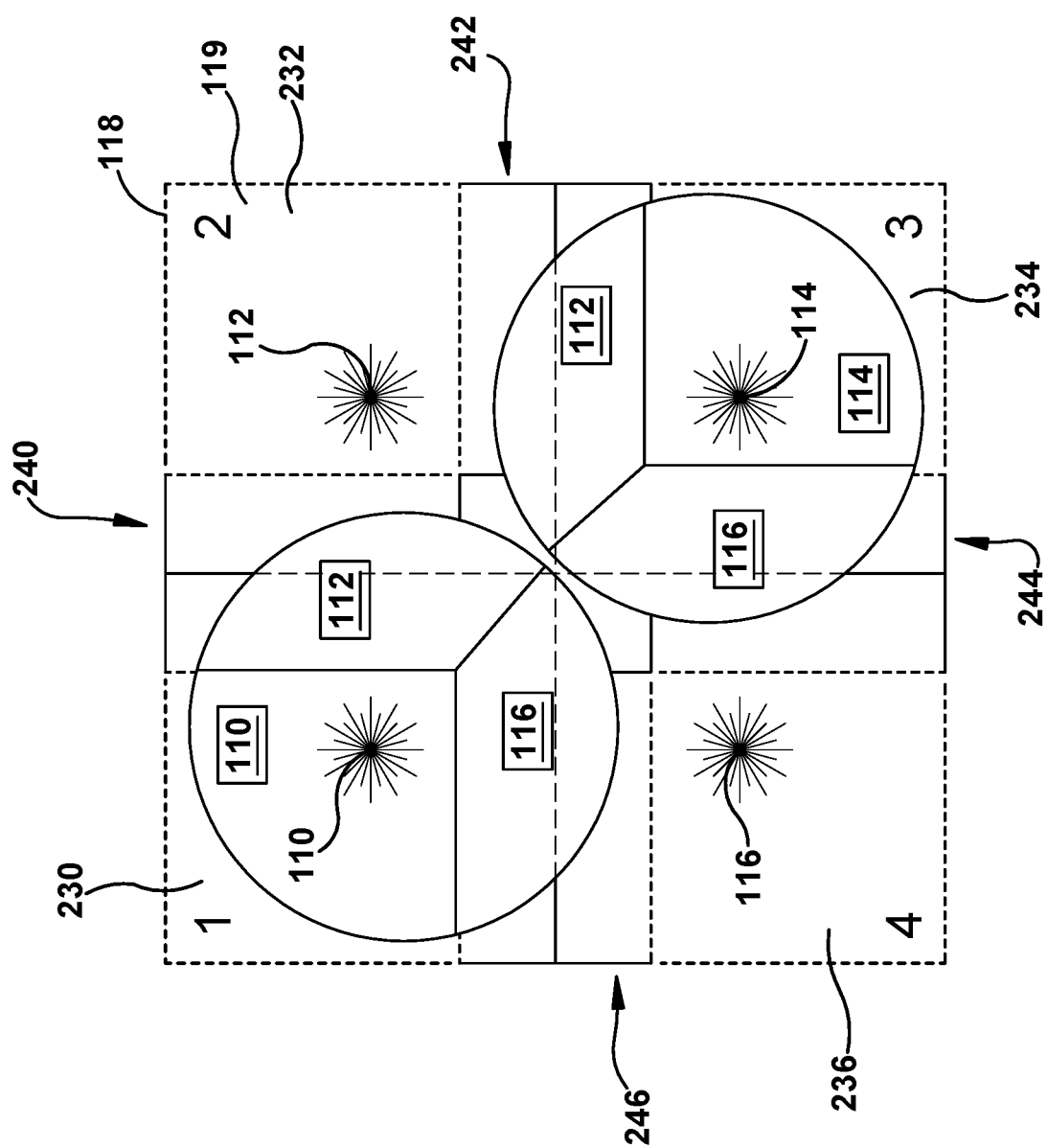
FIG. 6 shows a schematic plan view of respective fields of a four melting beam source additive manufacturing system.

FIG. 6 shows a schematic plan view of melting beams of AM system using four melting beam sources 110, 112, 114, 116, e.g., lasers. Each melting beam source 110, 112, 114, 116 has a field 1, 2, 3 or 4 including a non-overlapping field region 230, 232, 234, 236, respectively, in which it can exclusively melt metal powder, and at least one overlapping field region or interfaces 240, 242, 244, 246 in which two or more sources can melt metal powder. (Boxed numbers of sources 110, 112, 114, 116 indicate which source creates the shape illustrated thereabout). In this regard, each melting beam source 110, 112, 114, 116 may generate a melting beam (two shown, 160, 162, in FIG. 1), respectively, that fuses particles for each slice, as defined by object code 124O. For example, in FIG. 4, melting beam source 110 is shown creating a layer of AM structure 102 using melting beam 160 in one region, while melting beam source 112 is shown creating a layer of AM structure 102 using melting beam 162 in another region. Each melting beam source 110, 112, 114, 116 is calibrated in any now known or later developed manner. That is, each melting beam source 110, 112, 114, 116 has had its laser or electron beam's anticipated position relative to build platform 118 correlated with its actual position in order to provide an individual position correction (not shown) to ensure its individual accuracy. In one embodiment, each of plurality melting beam sources 110, 112, 114, 116 may create melting beams, e.g., 160, 162 (FIG. 4), having the same cross-sectional dimensions (e.g., shape and size in operation), power and scan speed. It is recognized that while four sources 110, 112, 114, 116 have been illustrated to describe an interface for overlapping fields, any two sources may create overlapping fields.

Returning to FIG. 4, an applicator 164 may create a thin, even layer of raw material 166 spread out as the blank canvas from which each successive slice of the final object will be created. However, as described in more detail herein, where build platform 118 is not horizontal or not planar, layer of raw material 166 is not evenly distributed, resulting in AM structures having removal planes for objects therein that are at different distances from upper surface 119 of build platform 118 (see e.g., FIGS. 2 and 3). Applicator 164 may move under control of a linear transport system 168. Linear transport system 168 may include any now known or later developed arrangement for moving applicator 164. In one embodiment, linear transport system 168 may include a pair of opposing rails 170, 172 extending on opposing sides of build platform 118, and a linear actuator 174 such as an electric motor coupled to applicator 164 for moving it along rails 170, 172. Linear actuator 174 is controlled by control system 120 to move applicator 164. Other forms of linear transport systems may also be employed. Applicator 164 take a variety of forms. In one embodiment, applicator 164 may include a body 176 configured to move along opposing rails 170, 172, and an actuator element (not shown in FIG. 4) in the form of a tip, blade or brush configured to spread metal powder evenly over build platform 118, i.e., build platform 118 or a previously formed layer of AM structure(s) 102, to create a layer of raw material. The actuator element may be coupled to body 176 using a holder (not shown) in any number of ways. The process may use different raw materials in the form of metal powder. Raw materials may be provided to applicator 164 in a number of ways. In one embodiment, shown in FIG. 4, a stock of raw material may be held in a raw material source 178 in the form of a chamber accessible by applicator 164. In other arrangements, raw material may be delivered through applicator 164, e.g., through body 176 in front of its applicator element and over build platform 118. In any event, an overflow chamber 179 may be provided on a far side of applicator 164 to capture any overflow of raw material not layered on build platform 118. In FIG. 4, only one applicator 164 is shown. In some embodiments, applicator 164 may be among a plurality of applicators in which applicator 164 is an active applicator and other replacement applicators (not shown) are stored for use with linear transport system 168. Used applicators (not shown) may also be stored after they are no longer usable.

In one embodiment, AM structure(s) 102 may be made of a metal which may include a pure metal or an alloy. In one example, the metal may include practically any non-reactive metal powder, i.e., non-explosive or non-conductive powder, such as but not limited to: a cobalt chromium molybdenum (CoCrMo) alloy, stainless steel, an austenite nickel-chromium based alloy such as a nickel-chromium-molybdenum-niobium alloy (NiCrMoNb) (e.g., Inconel 625 or Inconel 718), a nickel-chromium-iron-molybdenum alloy (NiCrFeMo) (e.g., Hastelloy® X available from Haynes International, Inc.), or a nickel-chromium-cobalt-molybdenum alloy (NiCrCoMo) (e.g., Haynes 282 available from Haynes International, Inc.), etc. In another example, the metal may include practically any metal such as but not limited to: system steel (e.g., H13), titanium alloy (e.g., Ti6Al4V), stainless steel (e.g., 316L) cobalt-chrome alloy (e.g., CoCrMo), and aluminum alloy (e.g., AlSi$_{10}$Mg). As will be described herein, datum structure(s) according to embodiments of the disclosure may be made from the same materials as AM structure(s) 102.

The atmosphere within processing chamber 142 is controlled for the particular type of melting beam source being used. For example, for lasers, processing chamber 142 may be filled with an inert gas such as argon or nitrogen and controlled to minimize or eliminate oxygen. Here, control system 120 is configured to control a flow of an inert gas mixture 180 within processing chamber 142 from a source of inert gas 182. In this case, control system 120 may control a pump 184, and/or a flow valve system 186 for inert gas to control the content of gas mixture 180. Flow valve system 186 may include one or more computer controllable valves, flow sensors, temperature sensors, pressure sensors, etc., capable of precisely controlling flow of the particular gas. Pump 184 may be provided with or without valve system 186. Where pump 184 is omitted, inert gas may simply enter a conduit or manifold prior to introduction to processing chamber 142. Source of inert gas 182 may take the form of any conventional source for the material contained therein, e.g. a tank, reservoir or other source. Any sensors (not shown) required to measure gas mixture 180 may be provided. Gas mixture 180 may be filtered using a filter 188 in a conventional manner. Alternatively, for electron beams, processing chamber 142 may be controlled to maintain a vacuum. Here, control system 120 may control a pump 184 to maintain the vacuum, and flow valve system 186, source of inert gas 182 and/or filter 188 may be omitted. Any sensors (not shown) necessary to maintain the vacuum may be employed.

A vertical adjustment system 190 may be provided to vertically adjust a position of various parts of AM printer 122 to accommodate the addition of each new layer, e.g., a build platform 118 may lower and/or chamber 142 and/or applicator 164 may rise after each layer. Vertical adjustment system 190 may include any now known or later developed linear actuators to provide such adjustment that are under the control of control system 120.

In operation, build platform 118 with metal powder thereon is provided within processing chamber 142, and control system 120 controls the atmosphere within processing chamber 142. Control system 120 also controls AM printer 122, and in particular, applicator 164 (e.g., linear actuator 174) and melting beam source(s) 110, 112, 114, 116 to sequentially melt layers of metal powder on build platform 118 to generate AM structure(s) 102, 200 (hereinafter just referenced with 102) according to embodiments of the disclosure. As noted, various parts of AM printer 122 may vertically move via vertical adjustment system 190 to accommodate the addition of each new layer, e.g., a build platform 118 may lower and/or chamber 142 and/or applicator 164 may rise after each layer.

Figure 2:
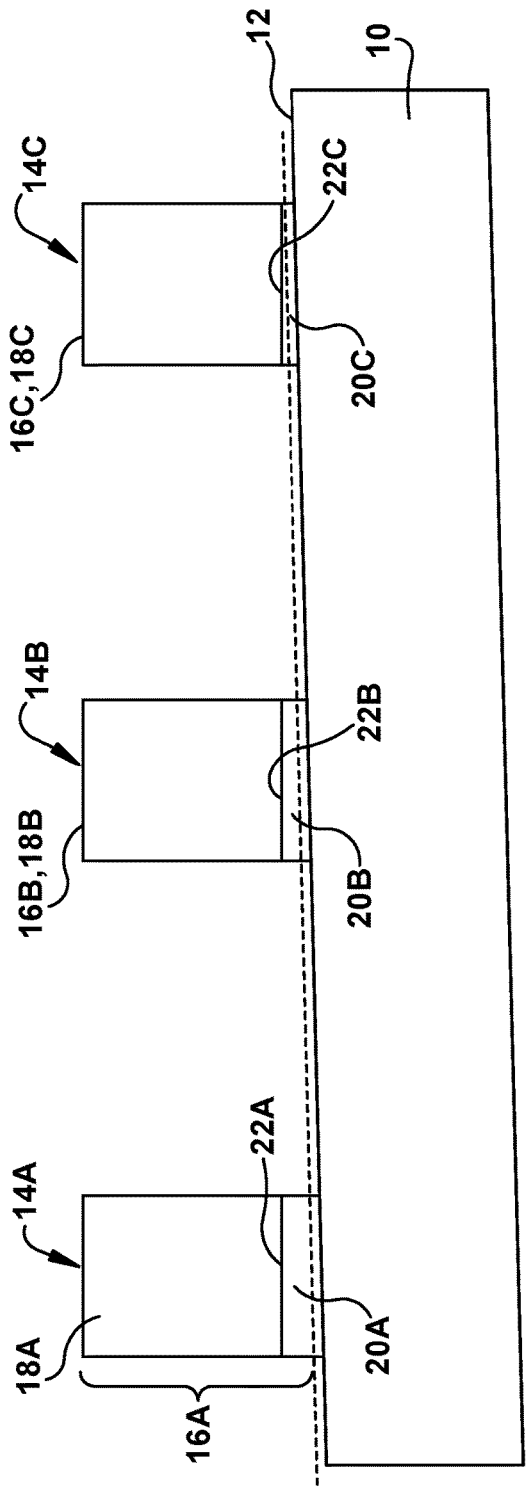
FIG. 2 shows a side view of a conventional non-horizontal build platform with AM structures thereon.
Figure 3:
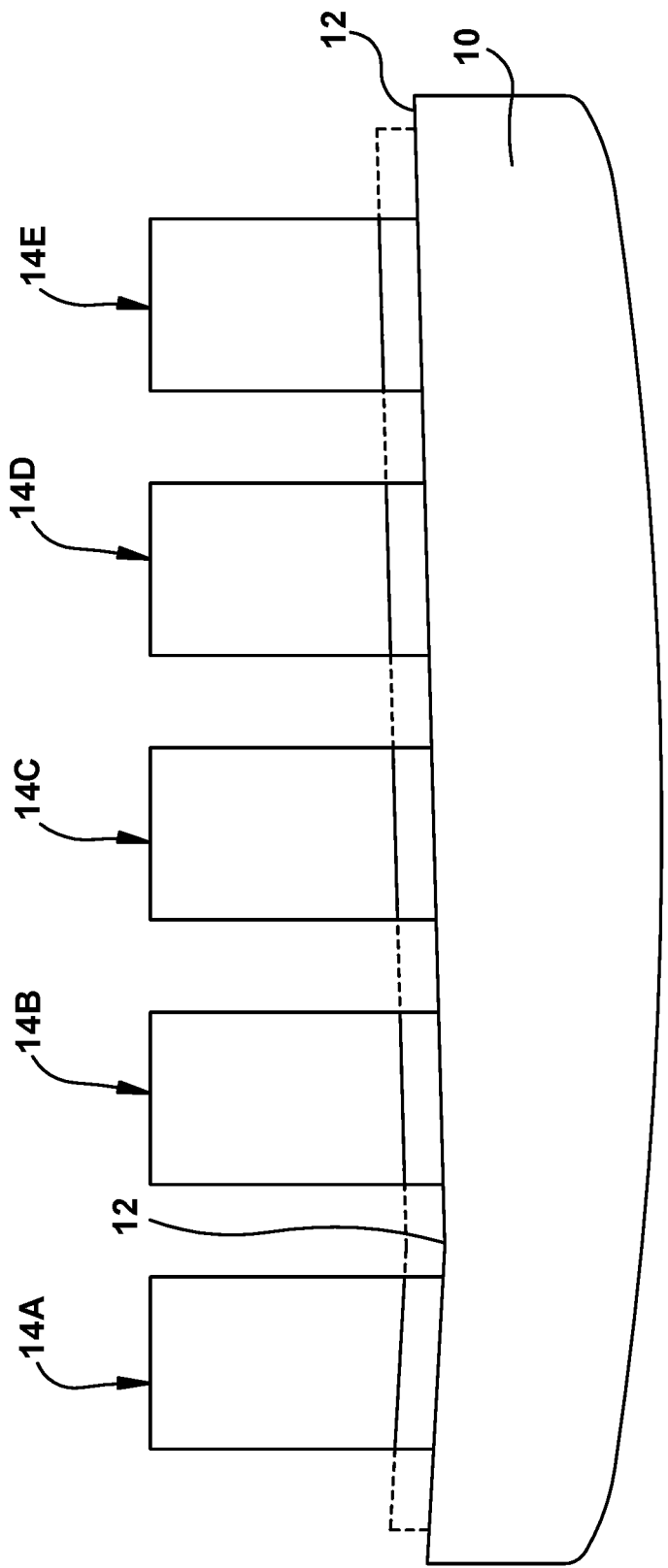
FIG. 3 shows a side view of a conventional non-planar build platform with AM structures thereon.

Referring to FIGS. 7-12, embodiments of the disclosure address the situation where build platform 118 is not horizontal in AM system 100, or includes an upper surface 119 that is not planar (see e.g., FIGS. 2 and 3).

Figure 7:
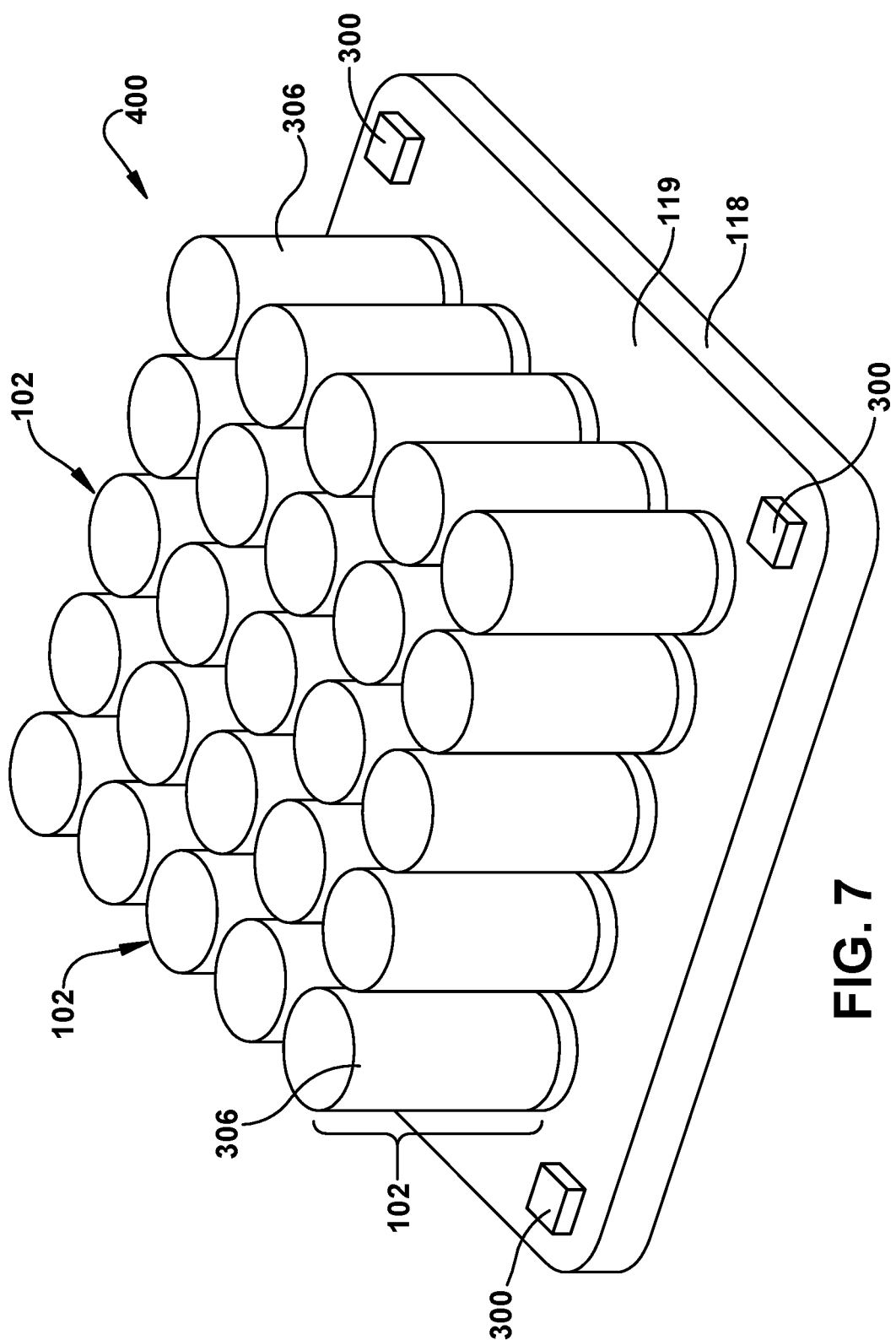
FIG. 7 shows a perspective view of a non-horizontal build platform having additive manufacturing (AM) structures including datum structures according to embodiments of the disclosure.

Referring initially to FIGS. 7-9, FIG. 7 shows a perspective view of a build platform 118 having AM structure(s) 102 thereon, and FIGS. 8 and 9 show side views of two different build platforms 118 with AM structure(s) 102 thereon. In the FIGS. 7 and 8 examples, build platform 118 is not horizontal, e.g., it is not mounted horizontally aligned with applicator 164 (FIG. 4) of AM system 100 (FIG. 4) and/or it is slanted, tilted, etc. As a result, AM structures 102 have different heights relative to upper surface 119 of build platform 118. FIG. 9 shows another embodiment of build platform 118 where it is not planar, e.g., it is curved and/or has raised or lowered areas, etc. Build platform 118 may be non-planar for a number of reasons. For example, it may deform during additive manufacturing, e.g., due to thermal stress, or the weight of objects 14A-E thereon. Alternatively, it may be non-planar due to machining between uses.

A method according to embodiments of the disclosure includes additively manufacturing AM structure(s) 102 on upper surface 119 of build platform 118, i.e., in an AM system 100 (FIG. 4). As described herein, each AM structure 102 may include a removal plane 314 extending therein defining an object 306 thereabove. That is, removal plane 314 defines a lowermost extent of object 306. AM structure 102 (FIGS. 8 and 9) is configured to have object 306 created therefrom by the object being cut away from a remaining portion 312 (FIGS. 8 and 9) of AM structure 102. That is, removal plane 314 represents a plane that when object 306 is cut away from remaining portion 312, object 306 is at or near its final dimensions. As used herein, "near" indicates only minor finishing work is required to finalize object 306 dimensions. While removal plane 314 is illustrated herein as a non-curved plane, it is understood that some deviation from perfectly planar, e.g., curvature, dips, verticality, etc., may be created during cutting of object 306 from remaining portion 312, e.g., within outer sides of object 306 and where the cutting element 304 allows. Here, datum structures 300 at the very least indicate the entry and exit planes at which cutting element 304 must enter and exit AM structure 102. As will be described, remaining portion 312 may remain on upper surface 119 of build platform 118 where object 306 is cut away therefrom, or it may be cut away from AM structure 102 after the AM structure 102 is removed from build platform 118.

While AM structure(s) 102 are being additively manufactured, in contrast to conventional processes, AM system 100 also additively manufactures at least one datum structure 300. In one embodiment, where object(s) 306 will be cut away from build platform 118, datum structure(s) 300 may be positioned relative to build platform 118. As noted, each datum structure 300 includes vertical reference plane 302 (FIGS. 8 and 9) for guiding cutting element 304 to remove the object 306 from remaining portion 312 of object 306. As observed best in FIGS. 8 and 9, each vertical reference plane 302 is horizontally coplanar with removal plane 314 of each object 306. In this fashion, cutting element 304 can simply use vertical reference plane(s) 302 as a guide to cut object(s) 306 at or near their desired, final dimensions. Datum structure(s) 300 may have any horizontal cross-sectional shape desired, and may be defined in object code 124O along with the rest of AM structure 102.

A height to which each datum structure 300 is built may be defined in a number of ways. In one embodiment, each datum structure 300 is defined in object code 124O to build until its respective vertical reference plane 302 is coplanar with a known level of removal plane 314 of each AM structure 102. In this regard, the height of removal plane 314 is predetermined in object code 124O based on object(s) 306 to be built.

In any event, as shown in FIGS. 8 and 9, datum structure(s) 300 are built along with AM structure(s) 102 in such a way that they have different heights depending on where they are on build platform 118, but they all have the same vertical reference plane 302, i.e., upper surface, coplanar with removal plane 314. For example, in FIG. 8, build platform 118 is lower on the left then on the right. Here, datum structure 300A, on the left, is taller than datum structure 300B, on the right, because layers of raw material 166 (FIG. 4) are not present at the location of datum structure 300B until later in the build. In other words, since the left side of build platform 118 is lower, structures (AM structure 102 or datum structure 300) start to build there earlier than on the right side, resulting in structures on the left being taller than those on the right. In FIG. 9, datum structures 300 (six) are provided between rows of AM structures 102. Here, datum structures 300 may have varying heights across upper surface 119 of build platform 118 depending on the severity of the non-planarity. For example, in FIG. 9, build platform 118 is lowest in area 322 and higher to the left and the right, but to different degrees. Here, for example, datum structure 300C, on the left, is shorter than datum structure 300D and 300E but taller than datum structure 300H on the far right. Each datum structure 300 (and AM structure 102) starts to build whenever layers of raw material 166 (FIG. 4) start to be distributed in an area in which they are assigned to be built, which can vary over upper surface 119. In any event, datum structures 300 extend from upper surface 119 to provide a vertical reference plane 302 coplanar with removal plane 314 of each AM structure 102.

As described herein and as shown for example in FIGS. 7-9, a plurality of AM structures 102 may be additively manufactured at one time. In this case, at least two removal planes 314 thereof are at different distances from upper surface 119 of build platform 118, but vertical reference planes 302 of datum structures 300 are horizontally coplanar with the removal planes 314 thereof to provide the vertical reference plane for guiding the cutting element 304 to remove the object from the remaining portion of the object.

Another step of the method may include removing object(s) 306 from remaining portion 312 of AM structure(s) 102. Cutting element 304 can be any now known or later developed element configured to cut through removal plane 314 to remove objects 306 from remaining portion 312 of AM structure(s) 102. In one embodiment, cutting element 304 can be that of a wire electrical discharge machine (w-EDM). The "guiding" of cutting element 304 by vertical reference plane(s) 302 can take any form that ensure cutting element 304 cuts through removal plane(s) 314 in a uniform manner. In one example, cutting element 304, e.g., of the w-EDM, passes parallel with each vertical reference plane 302, not cutting into it, and through each removal plane 314 of each object 310 to separate object(s) 306. In another embodiment, cutting element 304, e.g., of the w-EDM, may cut through a small predetermined, portion of each vertical reference plane 302 and through each removal plane 314 of each object 310 to separate object(s) 306.

Figure 10:
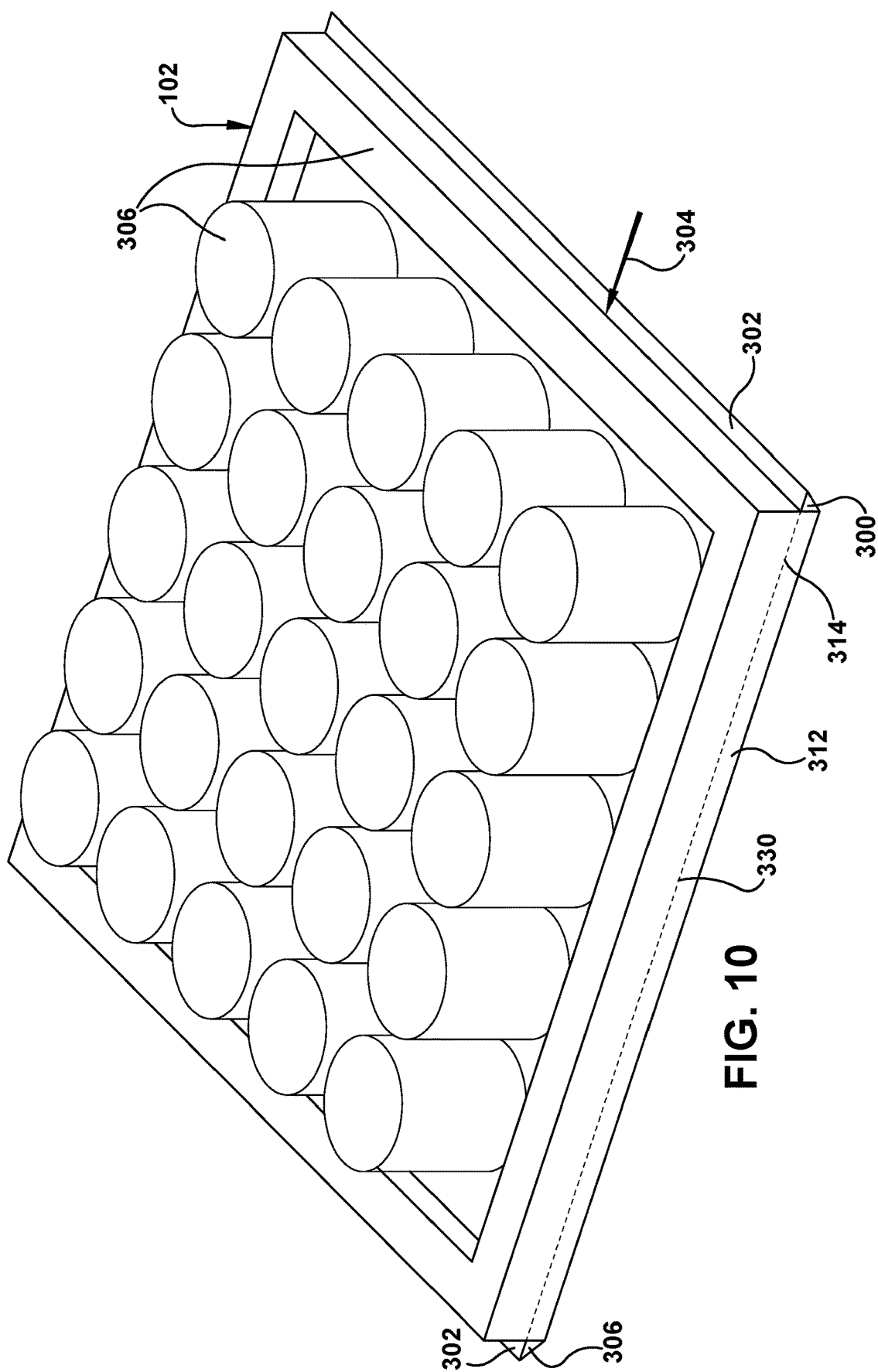
FIG. 10 shows a side view of an additive manufactured (AM) structures including datum structures thereon according to embodiments of the disclosure.

Datum structures 300 can be positioned in a number of locations. In the FIGS. 7-9 embodiments, each datum structure 300 is additively manufactured directly on upper surface 119 of build platform 118 and separated from AM structure 102. In other embodiments, it may be advantageous to additively manufacture datum structure(s) 300 coupled to AM structure 102. For example, FIG. 10 shows a side view of an AM structure 102 that has a relatively large size and may be additively manufactured, perhaps alone, on build platform 118. In this case, AM structure 102 may be removed from build platform before any remaining portion 312 of AM structure requiring removal is removed. AM structure 102 may be supported on another support such as a table. In this case, datum structure(s) 300 may be additively manufactured as part of AM structure 102. Here, AM structure 102 may include removal plane 314 extending therein defining object 306 thereabove. That is, removal plane 314 defines a lowermost extent of object 306. In this embodiment, datum structure(s) 300 may be coupled relative to AM structure 102 such that cutting element 304 can cut along removal plane 314. In one embodiment, shown in FIG. 10, datum structure(s) 300 may be coupled to AM structure(s) 102, e.g., to remaining portion 312. In another embodiment, shown in FIG. 11, AM structure 102 may include any of a wide variety of sacrificial support(s) 332 configured to support a section of thereof during additive manufacturing, and datum structure(s) 300 may be coupled to sacrificial support(s) 332. That is, additively manufacturing datum structure(s) 300 includes additively manufacturing them operatively coupled to sacrificial support 332. Sacrificial support 332 is not ultimately part of object 306. Datum structure(s) 300 include vertical reference plane 302 for cutting element 304 to remove object 306 from remaining portion 312 of object 310. Cutting element 304 can cut through removal plane 314 using vertical reference plane 302 that is horizontally coplanar with removal plane 314 of object 310, as previously described. In this embodiment, AM structure 102 may still be on build platform 118 (FIG. 11) or already separated therefrom (FIG. 10, on table). In the latter case, a lower surface 330 of object 306 of AM structure 102 may not be planar, e.g., due to the weight of the part. Here, removal plane 314 may be preconfigured to allow for removal of the non-planar lower surface 330 (and perhaps other structure not necessary to object 306), making the part planar on its lower surface 330. Thereafter, any remaining portion of support 332 may be removed in a conventional manner.

Figure 12:
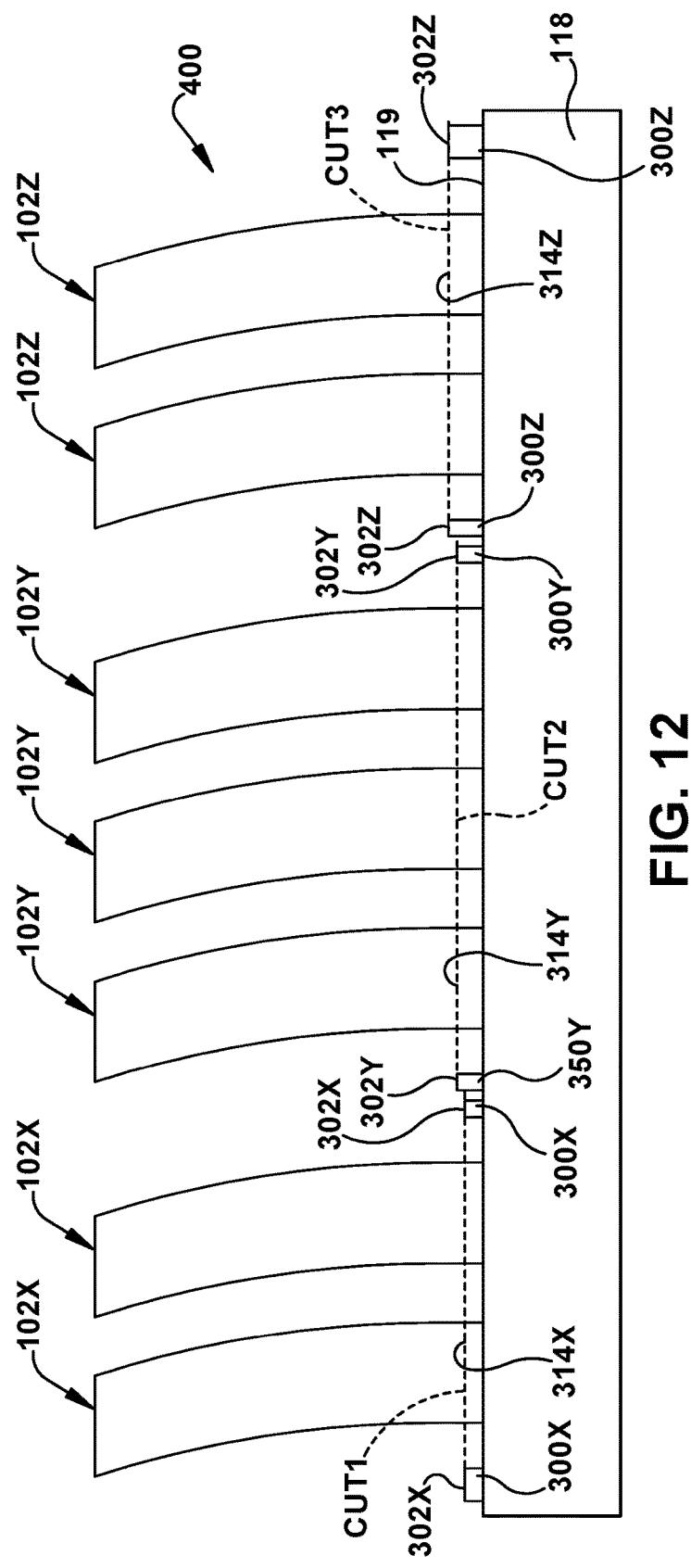
FIG. 12 shows a side view of a non-planar build platform having additive manufacturing (AM) structures including different pluralities of datum structures according to embodiments of the disclosure.

The number of datum structures 300 employed can be user selected, and may vary depending on any number of factors such as but not limited to: number of objects being built; size, dimensions of objects; type of cutting element; size of build platform, etc. For example, in FIG. 7, three datum structures (1 hidden) are shown; in FIG. 8, two datum structures 300 are shown; and in FIG. 9, six are shown. According to embodiments of the disclosure, any number of datum structures 300 can be employed. Where a plurality of datum structures 300 are additively manufactured, they may be spaced in any manner desired, e.g., as shown in FIGS. 7 and 9. For example, they may be spaced about build platform 118 or about AM structure(s) 102. They may be placed, for example, at ends of rows of AM structures 102, at corners of build platform 118, between rows of AM structures 102, etc., or wherever necessary to allow guiding of cutting element 304. Each vertical reference plane 314 of spaced datum structures 300 may be horizontally coplanar with other vertical reference planes 314 of the rest of the spaced datum structures. In another embodiment, as shown in FIG. 12, where a plurality of spaced datum structures 300 are additively manufactured, they may be grouped. That is, they may be grouped into different pluralities of spaced datum structures, e.g., 300X, 300Y, 300Z, to address one or more AM structures, e.g., 102X, 102Y, 102Z, that are incapable or not desirable to cut all at one time. For example, AM structures 102X, 102Y, 102Z may have removal planes 314X, 314Y, 314Z, respectively, that are too vertically different, to be cut in a single cut even with datum structures 300 provided. Here, each vertical reference plane 302 of each plurality (or group) of datum structures may be horizontally coplanar with each vertical reference plane 302 of the rest of the same plurality (or group) of spaced datum structures, but not horizontally coplanar with the vertical reference planes of the other plurality(ies) (groups) of datum structures. For example, vertical reference planes 302X of plurality of datum structures 300X are horizontally coplanar with each other, but not horizontally coplanar with vertical reference planes 302Y and/or 302Z of the other plurality(ies) of datum structures 300Y, 300Z. The same can be said of planes 302Y and 302Z relative to planes 302X. In this example, a first cut (cut1) would remove AM structures 102X through removal plane 314X, a second cut (cut2) would remove AM structures 102Y through removal plane 314Y, and a third cut (cut3) would remove AM structures 102Z through removal plane 314Z. Any number of groups can be provided, each containing any number of AM structures 102 (including just one).

Figure 11:
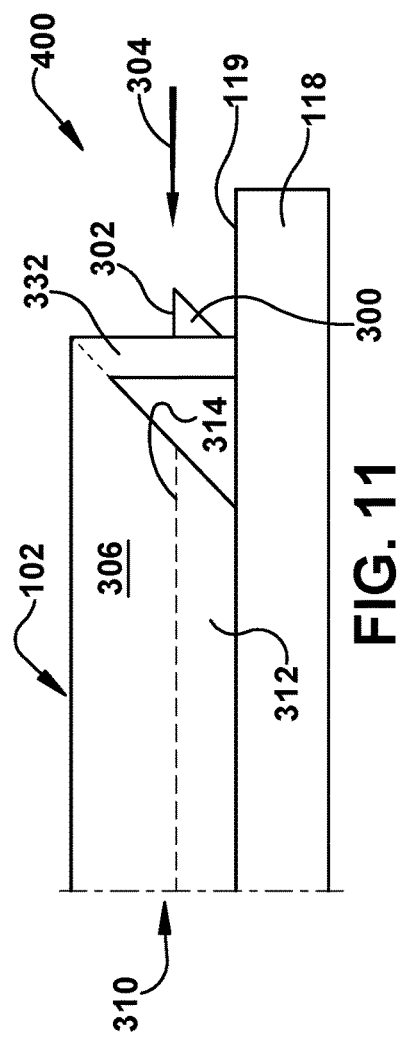
FIG. 11 shows a side view of a build platform having additive manufacturing (AM) structures including datum structures on a sacrificial support according to embodiments of the disclosure.

Embodiments of the disclosure may include an intermediate apparatus 400 (FIGS. 7-9, 11 and 12) including build platform 118 configured to support an object build in AM system 100. Build platform 118 has upper surface 119 that is non-horizontal and/or non-planar. Apparatus 400 may include AM structure(s) 102 on upper surface 119 with each AM structure 102 including removal plane 314 therein defining object 306 thereabove. Apparatus 400 may also include datum structure(s) 300 positioned relative to build platform 118 and each including vertical reference plane 302 for guiding cutting element 304 to remove the object from a remaining portion 312 of the AM structure. As noted, each vertical reference plane 302 is horizontally coplanar with removal plane(s) 314. Datum structure(s) 300 may be on build platform 118 separate from AM structure(s) 102, coupled to AM structure(s) (separate from build platform), or coupled to a sacrificial support 332 (FIG. 11).

In another embodiment, as shown in FIG. 10, AM structure 102 includes removal plane 314 extending therein defining object 306 thereabove, and datum structure(s) 300 coupled relative to the AM structure. Again, each datum structure(s) 300 includes vertical reference plane 302 for guiding cutting element 304 to remove the object from a remaining portion 312 of the AM structure through removal plane 314, the vertical reference plane being horizontally coplanar with the removal plane of the object. As noted, lower surface 330 of AM structure 102 may not be planar, e.g., after removal from build platform 118.

Embodiments of the disclosure automatically compensate for errors in tilt of the build platform caused by, e.g., the initial leveling of the platform in the AM system. In addition, embodiments of the disclosure automatically compensate for errors in planarity of the build platform caused by, e.g., machining between uses. Where the cutting occurs from the build platform, using datum structure(s) 300 provides improved accuracy compared to using the build platform itself for alignment as datum structure(s) 200 automatically compensate for errors in the build platform. Where the cutting occurs after removal of the AM structure, datum structure(s) 300 provide accurate cutting of unwanted portions thereof. Regardless of when the cut occurs, a precise vertical cut of height for the objects can be achieved despite build platform errors, enabling the cut to provide the final or near final desired object height and reducing any reworking of the objects. Shorter cycle times are also possible because the disclosure provides faster alignment of the build platform for object cut off. Further, the disclosure also reduces a scrap rate caused by cutting objects too short, and the amount of raw material stock required.

The foregoing drawings show some of the processing associated according to several embodiments of this disclosure. In this regard, each drawing or block within a flow diagram of the drawings represents a process associated with embodiments of the method described. It should also be noted that in some alternative implementations, the acts noted in the drawings or blocks may occur out of the order noted in the figure or, for example, may in fact be executed substantially concurrently or in the reverse order, depending upon the act involved. Also, one of ordinary skill in the art will recognize that additional blocks that describe the processing may be added.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or objects, but do not preclude the presence or addition of one or more other features, integers, steps, operations, elements, objects, and/or groups thereof. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. An apparatus, comprising:
a build platform configured to support an object build in an additive manufacturing system, the build platform having an upper surface being at least one of non-horizontal and non-planar;
an additively manufactured (AM) structure on the upper surface of the build platform, the AM structure including a removal plane extending therein defining an object thereabove; and
a datum structure positioned relative to the build platform and including a vertical reference plane for guiding a cutting element to remove the object from a remaining portion of the AM structure, the vertical reference plane horizontally coplanar with the removal plane.

2. The apparatus of claim 1, wherein the datum structure is directly on the build platform and separated from the AM structure.

3. The apparatus of claim 1, wherein the datum structure is coupled to the AM structure.

4. The apparatus of claim 1, wherein the AM structure further includes a sacrificial support configured to support a section of the AM structure during additive manufacturing, wherein the datum structure is coupled to the sacrificial support.

5. The apparatus of claim 1, wherein the datum structure includes a first plurality of spaced datum structures on the upper surface of the build platform, each vertical reference plane of the first plurality of datum structures being horizontally coplanar with other vertical reference planes of the rest of the first plurality of spaced datum structures.

6. The apparatus of claim 5, wherein the AM structure includes a plurality of AM structures each object thereof including a removal plane extending therein defining a respective lowermost extent of a respective object, wherein at least two of the removal planes are at different distances from the upper surface of the build platform, and wherein the vertical reference planes of the first plurality of datum structures are horizontally coplanar with the removal planes of the objects of the plurality of AM structures to provide the vertical reference plane for guiding the cutting element to remove each object from a respective remaining portion of a respective AM structure.

7. The apparatus of claim 5, wherein the datum structure includes a second plurality of spaced datum structures different than the first plurality of datum structures, each vertical reference plane of the second plurality of datum structures being horizontally coplanar with each vertical reference plane of the rest of the second plurality of spaced datum structures but not horizontally coplanar with the vertical reference planes of the first plurality of datum structures.

8. A method, comprising:
additively manufacturing at least one additive manufacturing (AM) structure on an upper surface of a build platform, the upper surface being at least one of non-horizontal and non-planar, each AM structure including a removal plane extending therein defining an object thereabove; and
while additively manufacturing the at least one AM structure, additively manufacturing at least one datum structure positioned relative to the build platform, each datum structure including a vertical reference plane for guiding a cutting element to remove the object from a remaining portion of the AM structure, wherein each vertical reference plane is horizontally coplanar with the removal plane of each AM structure.

9. The method of claim 8, wherein additively manufacturing the at least one datum structure includes additively manufacturing each datum structure directly on the upper surface of the build platform and separated from the at least one AM structure.

10. The method of claim 8, wherein additively manufacturing the at least one datum structure includes additively manufacturing each datum structure as part of the at least one AM structure.

11. The method of claim 8, wherein additively manufacturing the at least one AM structure includes additively manufacturing a sacrificial support for at least a section of each AM structure, wherein additively manufacturing the at least one datum structure includes additively manufacturing the at least one datum structure operatively coupled to the sacrificial support.

12. The method of claim 11, wherein additively manufacturing the at least one datum structure includes additively manufacturing a first plurality of spaced datum structures, each vertical reference plane of the first plurality of datum structures being horizontally coplanar with other vertical reference planes of the rest of the first plurality of spaced datum structures.

13. The method of claim 12, wherein additively manufacturing the at least one AM structure includes additively manufacturing a plurality of AM structures, each AM structure including a removal plane extending therein defining an object thereabove, wherein at least two of the removal planes are at different distances from the upper surface of the build platform, and
wherein the vertical reference planes of the first plurality of datum structures are horizontally coplanar with the removal planes of the plurality of AM structures to provide the vertical reference plane for guiding the cutting element to remove the object from the remaining portion of the AM structure.

14. The method of claim 12, wherein additively manufacturing the at least one datum structure includes additively manufacturing a second plurality of spaced datum structures different than the first plurality of spaced datum structures, each vertical reference plane of the second plurality of datum structures being horizontally coplanar with each vertical reference plane of the rest of the second plurality of spaced datum structures but not horizontally coplanar with the vertical reference planes of the first plurality of datum structures.

15. The method of claim 8 further comprising removing the object from the remaining portion of the AM structure on the upper surface of the build platform using wire electrical discharge machining (w-EDM), the cutting element of the w-EDM passing parallel with each vertical reference plane and through each removal plane of each object.

16. The method of claim 8 further comprising:
determining a change in vertical position of the upper surface of the build platform from an expected vertical position of the upper surface at at least one location during the additive manufacturing of the at least one datum structure and the at least one AM structure; and
adjusting the additive manufacturing of the at least one datum structure to ensure the vertical reference plane of the at least one datum structure is horizontally coplanar with the removal plane of the AM structure based on any change in vertical position of the upper surface of the build platform.

17. An additively manufactured (AM) structure, comprising:
a removal plane extending therein defining an object thereabove; and
at least one datum structure coupled relative to the AM structure, the at least one datum structure including a vertical reference plane for guiding a cutting element to remove the object from a remaining portion of the AM structure through the removal plane, the vertical reference plane horizontally coplanar with the removal plane of the object.

18. The AM structure of claim 17, wherein a lower surface of the AM structure is not planar.

19. The AM structure of claim 17, wherein the at least one datum structure is coupled to the AM structure.

20. The AM structure of claim 17, further comprising a sacrificial support configured to support a section of the AM structure during additive manufacturing, and wherein the at least one datum structure is coupled to the sacrificial support.

* * * * *